United States Patent
Milocco et al.

[11] Patent Number: 5,525,161
[45] Date of Patent: Jun. 11, 1996

[54] OPERATIONAL PROCESS FOR A DISHWASHING MACHINE

[75] Inventors: Claudio Milocco, Trieste; Mario Filippetti, Udine, both of Italy

[73] Assignee: Zanussi Elettrodomestici S.p.A., Pordenone, Italy

[21] Appl. No.: 358,768

[22] Filed: Dec. 19, 1994

[30] Foreign Application Priority Data

Dec. 20, 1993 [IT] Italy ............... PN93A0077

[51] Int. Cl.$^6$ ............................................ B08B 7/04
[52] U.S. Cl. .................. 134/18; 134/21; 134/25.2; 134/25.3
[58] Field of Search ................. 134/25.2, 25.3, 134/10, 57 D, 56 D, 18, 21

[56] References Cited

U.S. PATENT DOCUMENTS

| | | | |
|---|---|---|---|
| 3,664,159 | 5/1972 | Mazza | 68/205 R |
| 4,810,306 | 3/1989 | Noren | 134/25.4 |
| 4,872,466 | 10/1989 | Noren | 134/57 D |
| 5,211,189 | 5/1993 | Santarossa | 134/179 |
| 5,223,042 | 6/1993 | Milocco | 134/25.2 |
| 5,264,043 | 11/1993 | Milocco | 134/25.2 |
| 5,330,580 | 7/1994 | Whipple, III et al. | 134/25.2 |

FOREIGN PATENT DOCUMENTS

| | | |
|---|---|---|
| 0219704 | 4/1987 | European Pat. Off. . |
| 0237994 | 6/1991 | European Pat. Off. . |
| PN91A0071 | 10/1991 | Italy . |

*Primary Examiner*—Jan H. Silbaugh
*Assistant Examiner*—Saeed T. Chaudhry
*Attorney, Agent, or Firm*—Pearne, Gordon, McCoy & Granger

[57] ABSTRACT

The operational process includes a step in which water is let into a collecting sump (5) up to a static level (L). The water is then sprayed onto the washload through appropriate spray means (8, 13) that are supplied by a pump (7) having a suction mouth (11) whose top portion is situated at a level (H). The water is sprayed in an intermittent manner through a sequence of alternating spray periods (T) and pause periods (Tp) during which the pressure of the water downstream of the pump (7) is at its maximum (P1) and at its minimum (Pm), respectively. Each spray period (T) has a duration that is equal to the time needed for the water in the sump (5) to sink from the static level (L) to the level (H) of the pump suction mouth (11). Each pause period (Tp) has a duration that is equal to the time needed for the water in the sump (5) to rise again from the level (H) up to or nearly up to the static level (L).

11 Claims, 2 Drawing Sheets

ABSTRACT

OPERATIONAL PROCESS FOR A DISHWASHING MACHINE

BACKGROUND OF THE INVENTION

The present invention refers to an improved type of operational process for an automatic dishwashing machine.

Automatic dishwashing machines are commonly known to be provided with a program sequence control arrangement, either of an electromechanical or an electronic type. The control adapted to control the main operating components of the machine so as to enable pre-determined operational processes of the machine to be performed in a way that has been set in advance by a user. In particular, such operational processes usually consist of one or several successive steps that can be selectively included in or excluded from a given process. A traditional operational process would basically include a main washing phase, at least one rinse phase, and a final drying phase.

Each one of these washing and rinsing phases is usually known to be performed by first letting water from the delivery mains into a washing tank. The water is appropriately enriched through the addition of detergent or rinse aid, as the case may be. The water can then be heated up to a suitable pre-established temperature, sprayed onto the washload by means of rotating spray arms that are supplied by a circulation pump, and eventually let out of the machine tank into a drain.

In general, said aforementioned amount of water filled into the machine tank is substantially the same for all of the phases included in the operational process. The amount of water is adequately large so as to ensure a correct priming of the circulation pump and also to enable each single item in the washload to be properly sprinkled and wetted. Said washload is appropriately arranged in support baskets placed one above another inside the tank of the machine.

In view of reducing the overall water usage and, as a consequence, the overall energy consumption, a proposal has been set forth in the Italian patent application no. PN91 A 000071, filed on Oct. 22, 1991, to spray the water onto the washload during the rinsing phase, at a reduced pressure with respect to the pressure used during the washing phase. This, in an advantageous manner, enables a reduced amount of water to be used during the rinsing phase, thereby bringing about a corresponding energy saving effect.

On the other hand, it is not possible to achieve such an advantageous energy saving effect during the washing phase, though it would be quite desirable.

A quite drastic reduction in the usage of energy can be obtained in a dishwashing machine of the type described in EP 0 237 994, in which the rotating spray arms are supplied in an alternate manner by the circulation pump. Such a solution, however, calls for the additional use of water-flow diverting means, which therefore makes the construction of the washing machine undesirably more complicated. U.S. Pat. No. 3 664 159 discloses even a clothes washing machine that includes spray nozzles that are supplied intermittently with water by a circulation pump. Such a solution enables the effectiveness of the washing action on the clothes to be actually boosted. However, it does not specifically bring about any reduction in the energy or, particularly, water consumption of the machine.

SUMMARY OF THE INVENTION

It is therefore a purpose of the present invention to provide an operational process that is capable of being implemented in a dishwashing machine of a substantially traditional type. The process provides for a washing effectiveness and process duration that are comparable with those of traditional operational processes, arid enables the water and energy usage of the machine to be drastically reduced without making it necessary to complicate the construction of the same machine any further. These purposes and advantages are achieved by spraying the water intermittently. Spray periods lower the water level to the top of a pump suction mouth. Pause periods allow the water to rise.

According to the present invention, such an aim is achieved in an operational process for dishwashing machines that includes the features as described below and claimed in the appended claims.

BRIEF DESCRIPTION OF THE DRAWINGS

The characteristics and the advantages of the invention will be more clearly understood from the following description, which is given by way of non-limiting example with reference to the accompanying drawings, in which.

DETAILED DESCRIPTION OF THE PREFERRED EMBODIMENTS

Figure 1:
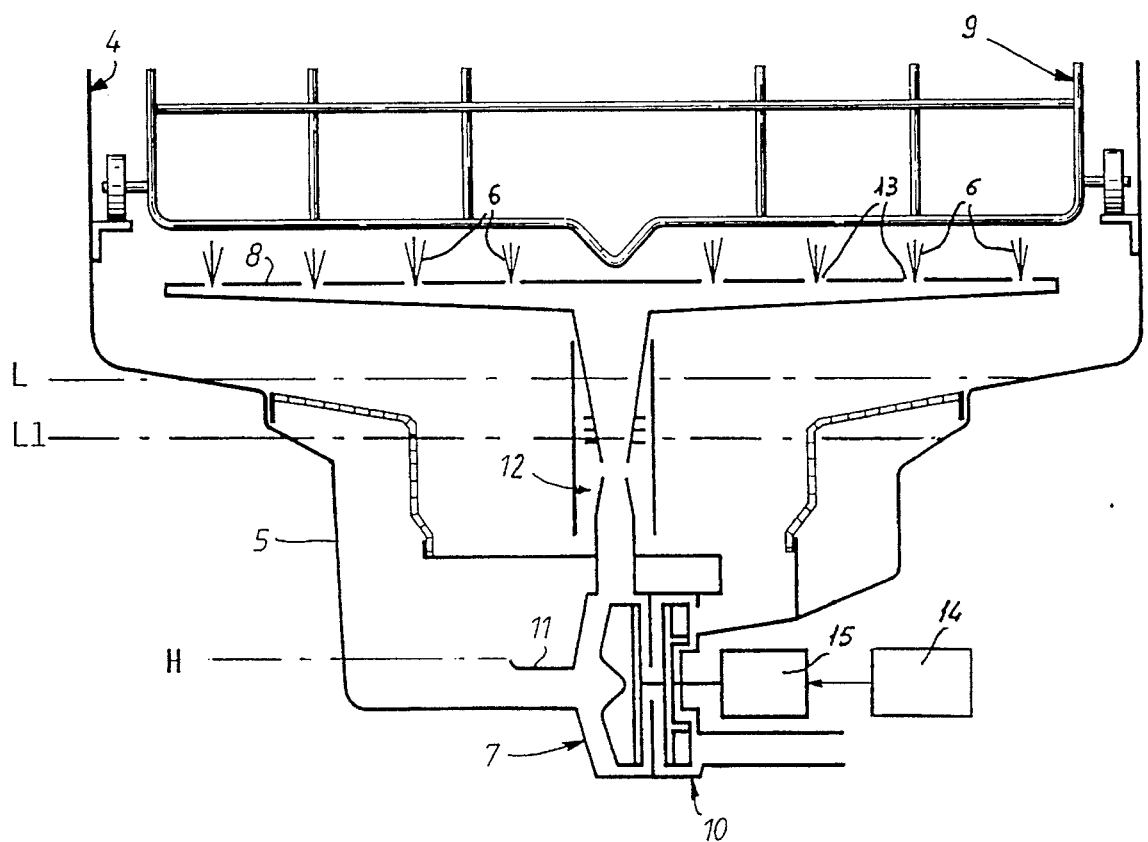
FIG. 1 is a schematical, partial elevational view of an automatic dishwashing machine adapted to perform an operational process according to the present invention.

Referring to FIG. 1, a dishwashing machine adapted for the present invention can be of a substantially traditional type, for instance as disclosed in U.S. Pat. No. 5,211,189 (incorporated herein by reference), so that the machine shall not be described here in detail. Generally, the dishwashing machine includes a washing tank 4, in which are housed spray means including at least one spray arm 8 capable of rotating in a substantially horizontal plane due to hydraulic reaction. The rotating spray arm 8 is in turn provided with a plurality of nozzles 13 adapted to spray a washload, which is appropriately arranged in a basket 9, with water. The water is pressurized by the action of a circulation pump 7, which is preferably of a centrifugal type and is driven by an electric motor 15. The motor 15, along with other main functional members of the machine, is controlled by a program sequence control apparatus 14 for automatically performing one or several pre-selectable processes, in particular an operational process according to the present invention.

Said program sequence control apparatus 14 may be of any electromechanical or electronic type, such as for instance a device using a Motorola 6804 or 6805 microprocessor. In any case, anyone skilled in the art will most readily appreciate that such a program sequence control apparatus can be most easily set to adjust various parameters, such as, the moments at which the various functional components of the machine have to be actuated or energized and the length of time during which they are supposed to operate. These parameters determine the operational process according to the invention, including at least one washing phase and/or at least one rinsing phase to handle the dishes loaded in the machine. The process is performed in a time-controlled manner by the control apparatus 14.

The rotating spray arm 8 is connected, through a supply conduit 12 or similar arrangement, to a delivery side of the circulation pump. A suction mouth 11 of the pump 7 is situated in correspondence of a sump 5 of the tank 4, which is provided to collect water let into the machine through known water supply means (not shown). For instance, said water supply means may be of the type described in EP 0 219 704.

Also, in a known manner, said electric motor 15 is arranged to drive a drain pump 10.

For optimum priming of the circulation pump 7, it is necessary that water be provided in the collecting sump 5 to a level which is at least equal to the level H at which the top portion of the suction mouth 11 of the pump 7 is situated. Furthermore, when the pump 7 is operating under steady-state conditions, water shall be present inside the washing tank 4 in an amount that is sufficient to substantially fill the chamber of the pump 7, the supply conduit 12 and the rotating spray arm 8, as well as to generate water jets 6 that flow out of the nozzles 13 to hit the washload arranged in the basket 9 and then fall down by gravity into the collecting sump 5. Such conditions are absolutely necessary in order to ensure that dishes are cleaned effectively.

It is apparent that the above-mentioned conditions can be implemented in a reasonably easy manner by anyone skilled in the art through an adequate sizing of the whole water circulation circuit of the machine. In dishwashing machines, such requirements are usually complied with by letting into the washing tank of the machine an excess amount of water, so as to basically ensure that the level of the water is in any case substantially higher than the aforementioned level H.

Figure 2:
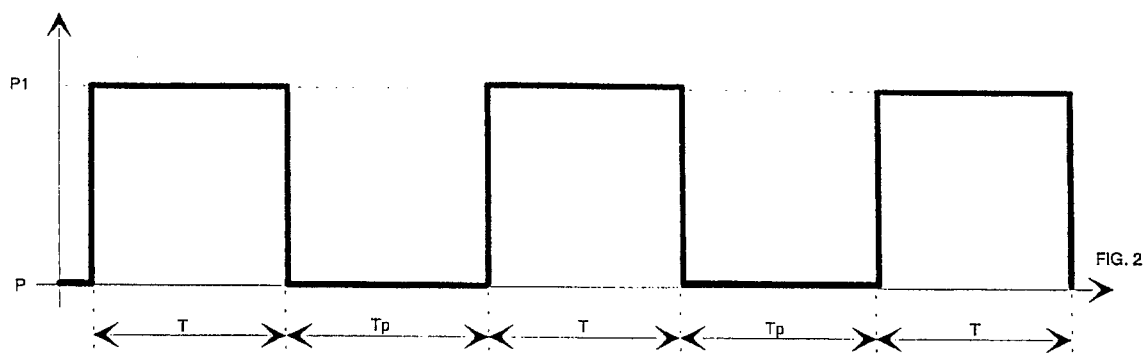
FIG. 2 is a graph schematically illustrating water pressure variations downstream of a circulation pump in a first embodiment of the operational process according to the present invention.

With reference also to the accompanying FIGS. 2 and 3, it can be seen that the operational process according to the invention is started at a moment to with a phase in which water is let into the washing tank 4 in a particularly reduced amount as will be more clearly indicated later on. This phase ends at a moment t1 when, under "static" conditions, i.e. with the circulation pump 7 de-energized and not operating, the water in the sump 5 reaches a static level L>H (FIGS. 1 and 3).

At moment t1 (or afterwards) the program sequence control apparatus 14 causes the circulation pump 7 to be energized and to operate in an intermittent way, i.e. in a sequence of periods T, spaced from each other by pauses Tp. During, the energized periods T, the pressure of the water downstream of the pump 7 (i.e. in the water circuit supplying the spray nozzles 13) is substantially at its highest level, equal to a value P1 (FIG. 2). During said pauses Tp, on the contrary, the water pressure is at its lowest level, equal to a value P. In the embodiment shown in FIG. 2, for instance, said lowest pressure P amounts practically to nothing during the pause periods Tp, which can for instance be brought about by switching off the pump 7.

Figure 3:
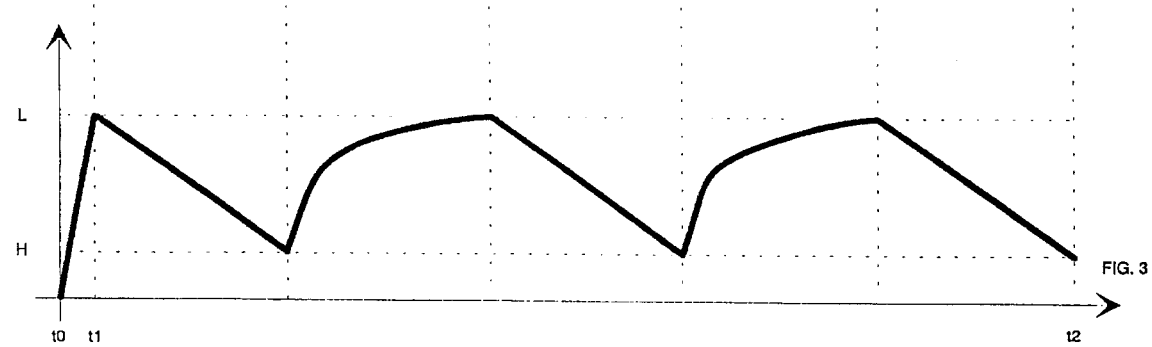
FIG. 3 is a graph schematically illustrating variations in the level of water collecting on the bottom of a washing tank in the first embodiment of the operational process according to the present invention.

According to an important feature of the present invention, said periods T have a duration that is substantially equal to the length of time required for the water in the sump 5, where it is taken in by the pump 7 and delivered to the tank 4, to fall from the static level L down to the afore cited level H, as shown in FIG. 3. In a preferred way, furthermore, said pauses Tp have a duration that is substantially equal to the length of time required for the water in the sump 5 to rise again from the level H to the level L.

The duration of both the periods T and the pauses Tp can be pre-determined by appropriately setting the program sequence control apparatus in accordance with the size of the water circuit of the machine. For instance, if approximately 3 liters of water are let into the sump 5 and the pump 7 has a delivery rate of approximately 60 l/min, the periods T and the pauses Tp might have a pre-established duration of approximately 2 to 3 seconds each.

Anyone skilled in the art will be able to appreciate that, as an alternative, the beginning and/or the end of such periods T and pauses Tp can be determined also in an automatic way. For this purpose appropriate sensors dan be used to detect (either directly or indirectly) the various levels of the water. Such devices (not shown) may be of any suitable type fitting the application.

In any case, as it is shown in FIG. 3, during the periods T, the level of the water in the sump 5 lowers from the static value L down to the value H in a substantially linear way to supply the water circuit of the machine comprising the pump 7, the conduit 12, the spray arm 8 and the jets 6. The duration of each one of said periods T is, as already mentioned, of such a short length as to prevent the water being sprayed in the tank 4 from substantially falling back into the sump.

During the pauses Tp, on the contrary, the level of the water in the sump 5 rises from its value H up to its static value L in a substantially exponential way owing to the fact that the water being sprayed in the tank 4 falls back by gravity into the same sump.

The operational process according to the invention terminates at a moment t2 when the program sequence control apparatus 14 de-energizes the circulation pump 7 and energizes a drain pump 10 to let the water out of the sump in a known way.

It should be noticed that the temporary operation of the circulation pump 7 during each period T only requires the availability in the collection sump 5 of a reduced amount of water (for instance 3 liters, as already mentioned). That is, the amount of water required is just sufficient to generate, for a very short length of time (i.e. 2 to 3 sec.), water jets 6 having the highest pressure P1, under optimum conditions as far as the priming of the pump 7 is concerned. As has already been said before, the water in the sump 5 reaches periodically down to its level H, which is defined by the suction mouth 11 of the circulation pump 7, but in no case does the water drop below said level. Furthermore, the level L, which is needed for a further operation of the pump 7 during each subsequent period T, is lowered in an advantageous way and is restored automatically during each pause Tp.

In the preferred case in which the operational process includes a washing phase, the water contained in the tank 4 is enriched through the addition of a detergent and, as the pump is operated intermittently, it is heated up by an electric resistance or similar heater (not shown) in a known manner.

The very low amount of water required inside the washing tank of the machine during the operational process can be heated up under a correspondingly reduced usage of energy and in a correspondingly short time. Detergent can be added to the water in a reduced quantity and becomes active much more quickly than it does in a traditional washing cycle. In an advantageous manner, therefore, this counterbalances the provision of the pauses Tp during which the water jets 5 do not perform any mechanical action on the washload. In any case, it should be emphasized that the detergent is able to perform its chemical action on the washload even during said pauses Tp, during which the washload itself remains wet with heated water and detergent thereon and therefore undergoes a "soaking" i.e. softening action that greatly contributes to the overall washing effectiveness.

Additionally, the spray nozzles 13 are supplied with water at the highest pressure P1 during periods T that are of a particularly short duration. During each period T, therefore, the rotating spray arm 8 performs, by hydraulic reaction (in a known manner), a correspondingly reduced rotation (for instance, 360°). In particular, at the beginning of each period T, the rotating spray arm 8 is in a substantially stationary condition and starts rotating slowly while overcoming the inertia of its own mass and the related friction with the water supply conduit 12. As a consequence, it has been shown, experimentally, that during each period T, the washing water jets 5 flowing out of the spray nozzles 13 are acting with their highest pressure P1, and in a variable way, on a relatively concentrated zone of the items in the washload. This has been demonstrated, also experimentally, to translate into an effective and even washing effect on the items in the washload in the course of the whole operational process from times t0 to t2.

Furthermore, washing effectiveness is additionally boosted by the fact (which has also been demonstrated experimentally) that during the pauses Tp, foam developed by the detergent tends to stay afloat on the surface of the water collecting in the sump 5, so that it is not substantially taken in by the pump 7 during its operation periods T. Therefore, the circulation pump does not undergo cavitation effects, while the pressure of the water jets 6 is substantially at the highest value during the periods T as opposed to what takes place in prior art solutions, in which the pump 7 operates in a continuous way. In other words, the pump 7 is able to advantageously perform in a way that is the optimum one at any time.

Conclusively, it has been demonstrated that a washing process according to the present invention is effective in enabling considerable savings to be obtained with respect to a corresponding traditional process. This has been achieved using a conventional dishwashing machine that did not require any substantial constructional adaptation or modification. Savings amounted to approximately 50% in water usage, 20% in power usage (in particular, for heating up the water) and approximately 10% in the time required for going through the whole cycle.

Such a saving effect is also achieved (albeit to a different extent) when the operational process according to the invention also includes either a "hot" rinse phase, i.e. a phase in which no detergent is added to the water, or a "cold" rinse phase, i.e. a phase in which the water is not even heated up. In any case, according to the present invention a complete operational process, including a washing phase, at least one cold rinse phase, and at least one hot rinse phase, is capable of bringing about corresponding savings in water, detergent, energy and time usage. It is obvious that in each one of such phases the pressure of the water jets 6 and the level of the water in the sump 5 will have a similar evolution pattern as illustrated in FIGS. 2 and 3, respectively.

It will be further appreciated that the afore described operational process may be the subject of a number of modifications without departing from the scope of the present invention.

Figure 4:
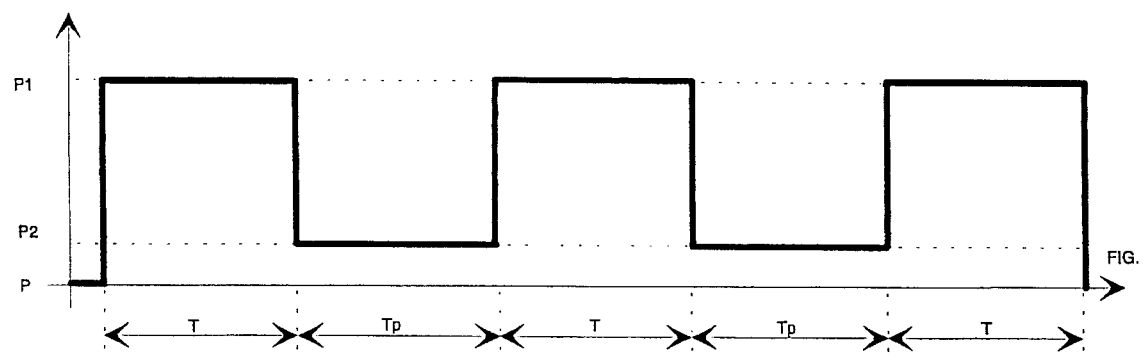
FIG. 4 is a graph schematically illustrating water pressure variations downstream of the circulation pump in a second embodiment of the operational process according to the present invention.
Figure 5:
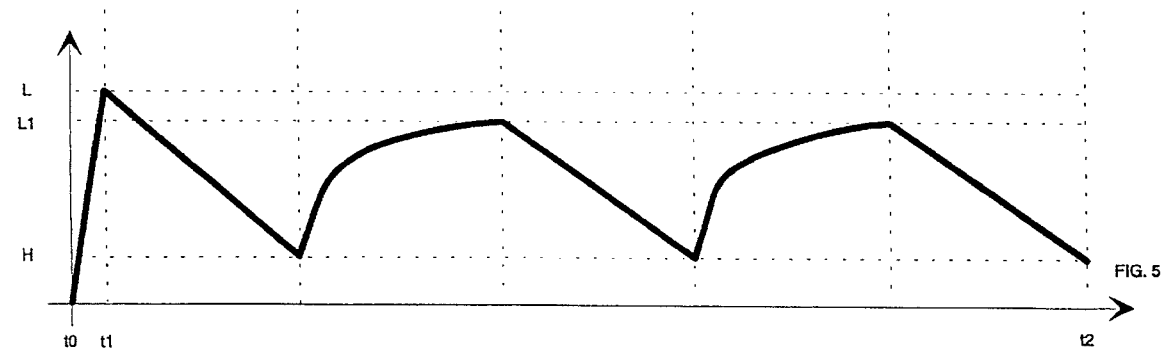
FIG. 5 is a graph schematically illustrating variations in the level of water collecting on the bottom of the washing tank in said second embodiment of the operation process according to the present invention.

With reference to FIGS. 1, 4 and 5, for example, an embodiment will be further described that additionally enables water-induced noise generated in the machine during such an intermittent operation of the spray nozzles 13 to be minimized.

As opposed to what has been previously described with reference to FIGS. 2 and 3, in the embodiment illustrated in FIGS. 4 and 5, the lowest pressure downstream of the pump 7 is not nil during the pauses Tp. On the contrary the lowest pressure is equal to a pre-determined value P2 which may be quite easily calculated by anyone skilled in the art according to the characteristics of the water circuit of the machine. In particular, said lowest pressure P2 is such as to maintain the water supply circuit to the spray nozzles 13 at least partially full of water without, however, causing any substantial water jet 6 to flow out of said spray nozzles themselves.

In the illustration shown in FIG. 1, such a water supply circuit comprises the pump 7, the connection conduit 12, and the rotating spray arm 8. It is clear that, in the quite common case in which the circulation pump 7 supplies several rotating spray arms 8 arranged one above another, the above cited substantial filling of the water supply circuit will occur to the maximum possible extent without causing any substantial water jet 5 to flow out of the spray nozzles 13 of the lower rotating spray arm.

It is also apparent that the operational process according to the present invention can also be implemented when using a dishwashing machine of the type described in EP 0 237 994, i.e. a machine which is provided with rotating spray arms arranged one above another and supplied with water alternately. In this case, the afore cited lowest pressure P2 during the pauses Tp may be such as to maintain the water in the rotating spray arm that is from time to time supplied by the pump substantially at the level of the respective nozzles.

In any case, during the periods T in which the water is brought to its highest pressure P1, the nozzles 13 start almost immediately to eject the washing water jets 6. A certain hydraulic noise is generated due to the water impinging against the walls of the aforementioned water circulating circuit. Such a hydraulic noise is particularly reduced in the embodiment illustrated FIGS. 4 and 5, since less of the water circulating circuit must be filled with water when the pressure downstream of the pump 7 changes from its value P2 to the highest value P1.

As shown in FIG. 5, during the operational process from times t0–t2, the level of the water in the sump 5 varies in a way that is similar to that described with reference to FIG. 3. The difference is that, during the pauses Tp, the water level increases in this case from the value H to a value L1 <L. The difference between the level L and the level L1 is determined by the amount of water required to substantially fill the water circuit supplying the nozzles 13, as previously described.

Anyone skilled in the art will be able to appreciate that the above-mentioned pressure variations between the values P1 and P can be brought about in different ways, for instance by means of a valve or similar means controlled by the program sequence control apparatus 14 and adapted to vary the flow section of the water circuit supplying the nozzles 13. In a preferred manner, however, the pressure of the water downstream of the circulation pump 7 is varied by the program sequence control apparatus 14 by correspondingly varying the rotation speed of the electric motor 15. In such a case, the motor 15 can be implemented as described for instance in the afore cited Italian patent application no. PN91 A 00071.

Other variations and arrangements are also within the scope of the invention as recited in the following claims.

What is claimed is:

1. An operational process for a dishwashing machine having at least one of a washing phase and a rinse phase, said machine including a program sequence control apparatus (14) for controlling the phases; a collecting sump (5); spraying means (8,13); a circulation pump (7) supplying the spraying means; and a suction mouth (11) of the pump, a top portion of the mouth being arranged at a pre-determined level (H) in the sump, said process comprising the steps of inletting water into the collecting sump (5) up to a static level (L); and spraying water onto a washload by said spraying means in an intermittent manner with an alternating sequence of spraying periods (T) and pauses (Tp) during which pressure of the water downstream of the pump (7) is at a highest value (P1) and a lowest value (P), respectively, characterized in that each one of said spraying periods (T) has a duration that is substantially equal to a time taken by the water in the sump (5), due to its being drawn in by the pump (7) and delivered by said spraying means (8, 13), to fall from said static level (L) down to said pre-determined level (H) of the pump suction mouth (11).

2. An operational process according to claim 1, further comprising the step of collecting water sprayed by the spray arms in the sump (5) by gravity and characterized in that each one of said pauses (Tp) has a duration that is substantially equal to a time taken by the water in the sump (5) to rise from said pre-determined level (H) to said static level (L).

3. An operational process according to claim 1, characterized in that said lowest pressure (P) during said pauses (Tp) is substantially nil.

4. An operational process according to claim 1, wherein said circulation pump (7) is connected through a water delivery circuit (12) with said spraying means (8, 13), and further comprising the step of maintaining said lowest pressure during said pauses (Tp) at a value (P2) such that said water delivery circuit and spraying means are at least partially filled with water so as to minimize related hydraulic noise generated when the water in the circuit changes to its highest pressure (P1) during said periods (T).

5. An operational process for a dishwashing machine including a collection sump (5), spraying means (8, 13), and a circulation pump (7) supplying the spraying means (8, 13) from the sump (5), said process comprising: an inlet of water into the collecting sump (5) up to a static level (L); and water being sprayed onto a washload by the spraying means (8, 13) in an intermittent manner with an alternating sequence of spraying periods (T) and pauses (Tp) during which pressure of the water downstream of the pump (7) is at a high value (P1) and a low value (P), respectively, characterized in that said spraying periods (T) have a duration that is substantially equal to a time taken by the water in the sump to fall from said static level down to a pre-determined level (H).

6. An operational process according to claim 5, characterized in that the pump includes a suction mouth (11) having a top portion arranged not higher than the predetermined level (H) in the sump (5).

7. An operational process according to claim 5, characterized in that the pump includes a suction mouth (11) having a top portion arranged at the pre-determined level (H) in the sump (5).

8. An operational process according to claim 7, further comprising the step of collecting water sprayed by the spray arms in the sump (5) by gravity wherein the pauses (Tp) have a duration substantially equal to a time taken by the water in the sump to rise from said pre-determined level (H) to said static level (L).

9. An operational process according to claim 7, wherein said circulation pump (7) is connected through a water delivery (12) circuit with said spraying means (8,13), and further comprising the step of maintaining said lowest pressure during said pauses (Tp) at a value (P2) such that said water delivery circuit and spraying means are at least partially filled with water so as to minimize related hydraulic noise generated when the water in the circuit changes to its highest pressure (P1) during said periods (T).

10. An operational process according to claim 5, further comprising the step of collecting water sprayed by the spray arms in the sump (5) by gravity wherein the pauses (Tp) have a duration substantially equal to a time taken by the water in the sump to rise from said pre-determined level (H) to said static level (L).

11. An operational process according to claims 5, wherein said circulation pump (7) is connected through a water delivery (12) circuit with said spraying means (8, 13) and further comprising the step of maintaining said lowest pressure during said pauses (Tp) at a value (P2) such that said water delivery circuit and spraying means are at least partially filled with water so as to minimize related hydraulic noise generated when the water in the circuit changes to its highest pressure (P1) during said periods (T).

* * * * *